June 2, 1964  D. G. KELSTROM ETAL  3,135,296
LAMINATED TUBING
Filed Oct. 12, 1960  3 Sheets-Sheet 1
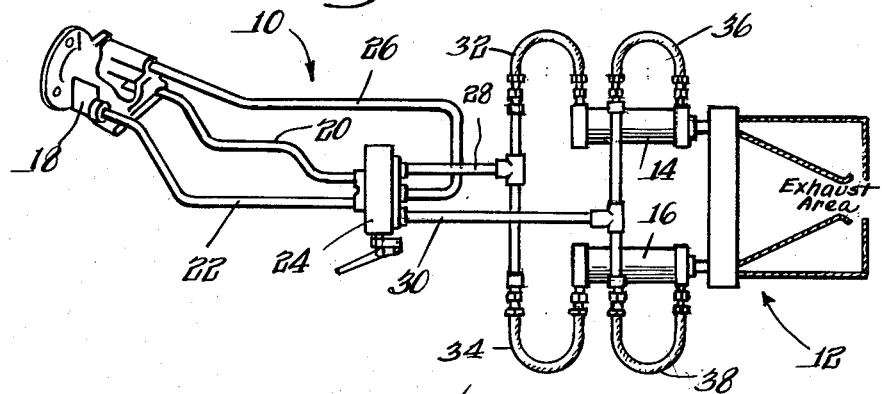
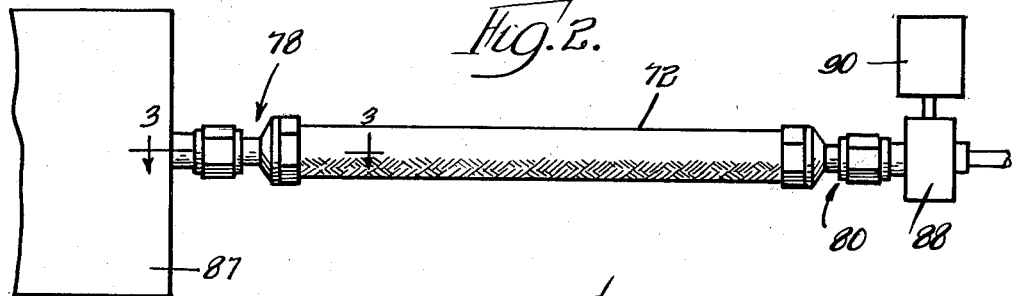
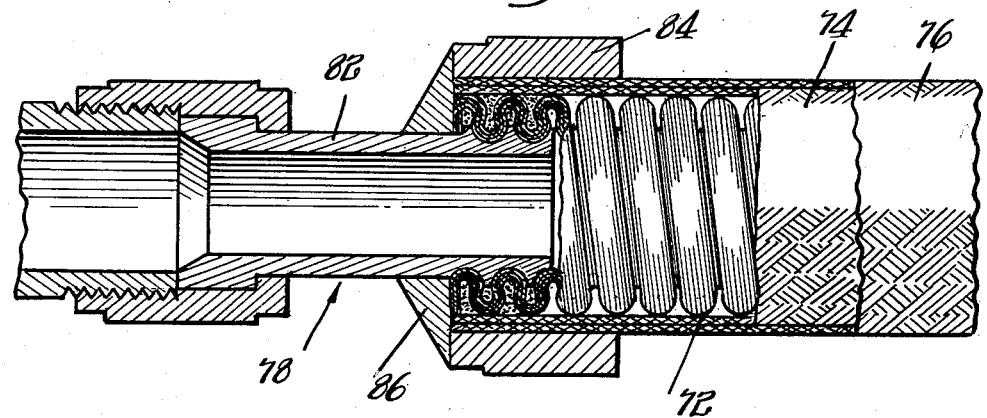
INVENTORS
Donald G. Kelstrom
Raymond C. Andersen
By: Olson & Trexler  attys.

June 2, 1964  D. G. KELSTROM ETAL  3,135,296
LAMINATED TUBING
Filed Oct. 12, 1960  3 Sheets-Sheet 2
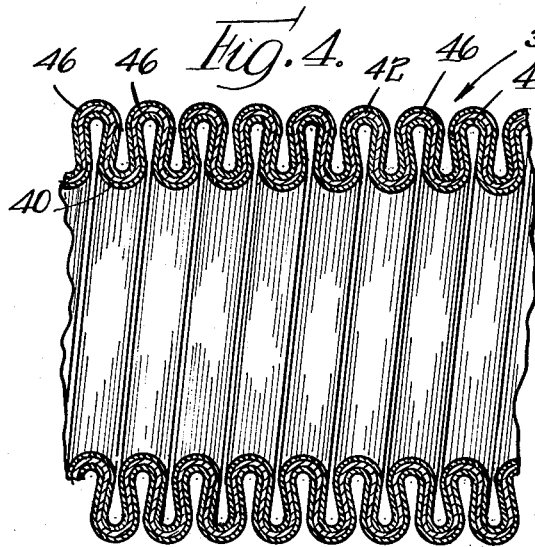
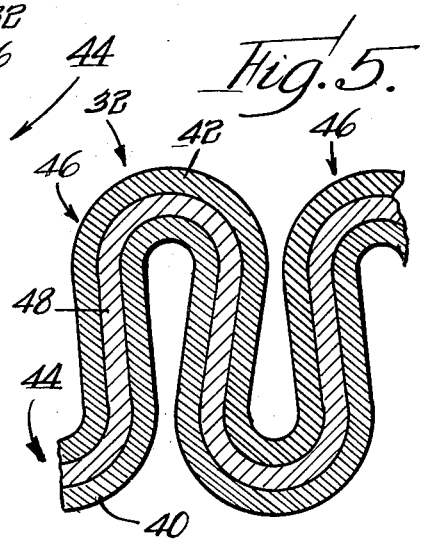
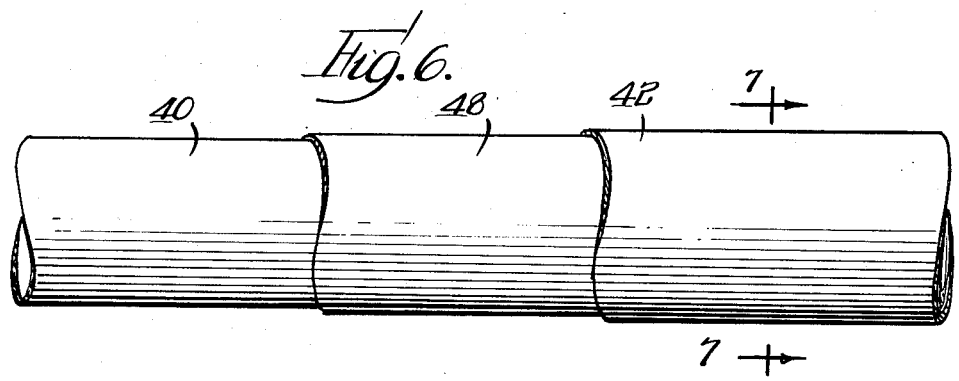
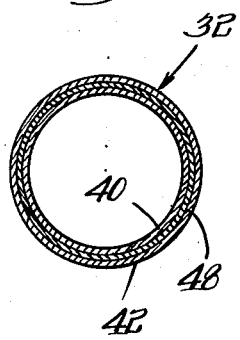
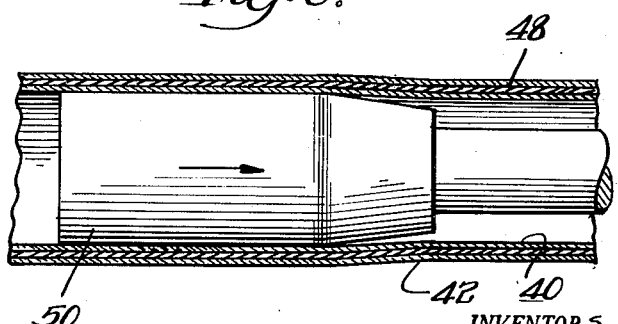
INVENTORS.
Donald G. Kelstrom
Raymond C. Andersen
By: Olson & Trexler attys

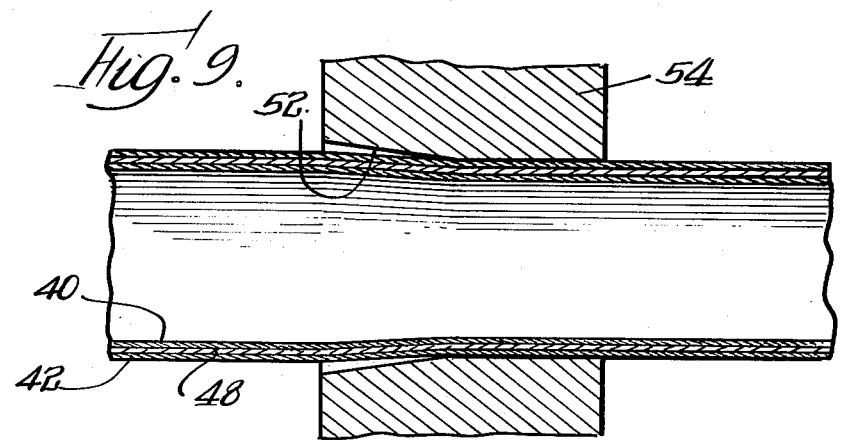
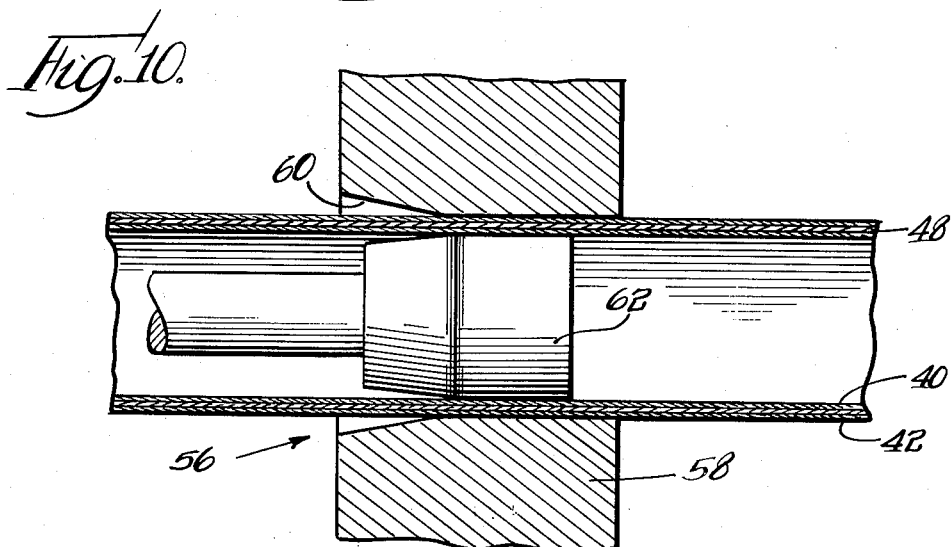
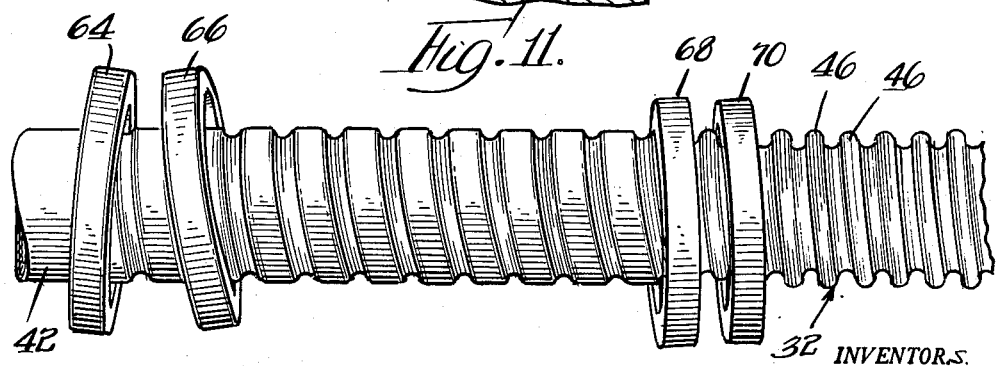

United States Patent Office 3,135,296
Patented June 2, 1964

3,135,296
LAMINATED TUBING
Donald G. Kelstrom, Elmhurst, Ill., and Raymond C. Andersen, deceased, late of Lombard, Ill., by Jessie K. Peterson, Lombard, Ill., administratrix, assignors to Flexonics Corporation, Maywood, Ill., a corporation of Illinois
Filed Oct. 12, 1960, Ser. No. 62,303
3 Claims. (Cl. 138—122)

The present invention relates to fluid systems of a character such that use of flexible hose or conduit in at least a portion of each system is highly desirable or even essential. The arts relating to the use of flexible hose in fluid systems and to the production of hose have been the object of extensive research and development over a long period of time.

Yet, despite the many developments in this field, there are a number of fluid systems and environments in which flexible hose could be used to great advantage, but which impose such great stress on the hose that weaknesses and failures of hose used in these environments have been a serious and a persisting problem for which those working in the field have been unable to provide an adequate solution.

Some of the most troublesome problems with hose failures arise in environments where hose or flexible conduit is subjected to rapid changes in fluid pressure or severe vibratory forces or both, particularly in situations where high fluid pressures and extreme temperatures are involved.

Where extreme temperatures and high fluid pressures are involved it is often extremely desirable to use flexible metal hose or conduit. Characteristically, metal hose has both inherently high strength and the ability to maintain its strength under temperature conditions which would cause weakening and failure of hose formed from nonmetallic hose materials.

Yet, despite intensive effort applied to the problem, it has heretofore been impossible to obtain satisfactory service from metal hose or flexible metal conduit in many fluid systems where pressure or temperature conditions make the use of metal hose extremely desirable. In these systems the metal hose suffers from premature failure when subjected to either mechanically or hydraulically induced shock loads and to vibration even though the fluid pressure load is far below the ultimate strength of the hose structure.

Since those concerned with this problem have been unable to overcome the failure of metal hose in such environments, it has been necessary to use hose formed of other materials; such, for example, as the best available elastomeric or polymeric compounds. However, such hose is subject to serious shortcomings. Most of these nonmetallic materials suffer a marked loss of strength under elevated temperatures and many lose their strength and dependability when exposed to low temperatures.

Moreover, nonmetallic hose is subject to loss of strength through aging and through various conditions which may be encountered in the environment.

One object of the invention is to provide improved hydraulic systems which are not subject to failure of flexible hose or conduit used in the systems even though the hose may be subjected to extreme temperatures and to severe and extensively repeated shock loadings and vibratory forces applied to the hose either mechanically or through the impact of fluid pressure or both.

Another object is to eliminate failures of flexible all-metal hose in fluid systems having components which apply to hose connected to the components, stresses and physical conditions which have previously caused premature failures of metal hose.

A further object is to provide for use in severe environmental conditions, high strength flexible metal hose having an inherent ability to maintain its strength under extreme temperature conditions and to maintain its integrity and effectiveness unimpaired over a long service life even when subjected to repeated shock loadings and rapidly recurring stresses applied to the hose, either mechanically or through the fluid in the hose or both.

Another object of the invention is to provide impervious, flexible metal hose or tubing constructed and formed in a manner which provides great strength and flexibility in the hose while at the same time rendering the hose substantially immune to fatigue failure when subjected to repeated shock loading and vibratory forces.

Another object is to provide corrugated all-metal hose or conduit which provides great strength and flexibility in the hose together with an effective immunity from fatigue failure due to the repeated application to the hose of stresses within the elastic limits of the hose structure.

Other objects and advantages will become apparent from the following description of the invention taken in conjunction with the drawings, in which:

FIGURE 1 is a perspective view of a hydraulic system embodying the invention;

FIG. 2 is a side view showing a high pressure hose constructed in accordance with the invention and connected between hydraulic elements which apply shock loadings to the hose such as would cause failure of conventional hose in the same environment;

FIG. 3 is a longitudinal sectional view of the high pressure hose and coupling structure on an enlarged scale taken with reference to the line 3—3 of FIG. 2;

FIG. 4 is a longitudinal sectional view of impervious, corrugated metal hose constructed in accordance with the invention;

FIG. 5 is a fragmentary longitudinal sectional view of the hose wall on a greatly enlarged scale illustrating the convolution profile and the composite structure of the hose wall;

FIG. 6 is a side view showing telescoped tubes prior to corrugation of the tubes to form the flexible metal hose;

FIG. 7 is a cross-sectional view of the tubes, taken along the line 7—7 of FIG. 6;

FIG. 8 is a longitudinal sectional view of the telescoped tubes of FIG. 6 together with an illustration of internal sizing of the tubes to expand the innermost tube;

FIG. 9 is a longitudinal sectional view of the tubes of FIG. 7 illustrating drawing of the tubes to reduce the diameter of the outermost tube;

FIG. 10 is a longitudinal sectional view illustrating compression of the tubes to have intimate contact with each other prior to corrugating the tubes to form the hose; and FIG. 11 is a side elevational view illustrating the formation of helical convolutions in the tubes to form corrugated flexible hose.

An example of a hydraulic system which is improved in accordance with the invention is illustrated in FIG. 1 and denoted by the number 10. The hydraulic system 10 is designed for use in an airplane to control the exhaust nozzle area of a jet engine to obtain optimum performance of the engine.

The exhaust nozzle area of a jet engine (not shown) is determined by an adjustable control unit 12 illustrated schematically in FIG. 1. The detailed construction of the control unit 12 is well known to those skilled in the art and need not be described here.

The nozzle control unit 12 is actuated, as shown in FIG. 1, by a pair of reciprocable hydraulic motors 14, 16 connected to the control unit and operated by hydraulic fluid supplied from a hydraulic pump 18. As shown, an output line 20 from the pump 18 and a return line 22 to the pump connect with a rapid action multiple valve 24 used to control the hydraulic motors 14, 16. The pump 18 itself is controlled by fluid conducted to the pump through a feedback line 26 from the control valve 24.

The valve 24 is connected to one end of each of the two reciprocable hydraulic motors 14, 16 through a first control fluid line 28. The opposite ends of the two motors 14, 16 are connected to the control valve 24 through a line 30.

The specific construction of the valve 24 is not a part of the invention. The valve operates in a well known manner to control the flow of fluid through the two lines 28 and 30 to supply operating fluid under pressure to either end of the respective motors 14, 16 and to exhaust fluid from the other end of the motors.

The operating characteristics of the hydraulic system 10 illustrated and the environmental conditions in which it is used are quite relevant to the inventon here. Various components of the system 10, including the lines 28 and 30 connected between the valve 24 and the motors 14, 16 are subjected to high ambient temperatures and to high temperatures of the hydraulic fluid used. While being exposed to such elevated temperatures, the connecting lines 28, 30 are subjected to repeated shock loadings from rapid changes in the pressure of the liquid within the lines.

These rapid changes in pressures arise from a number of causes including high acceleration loadings in the system, rapid operation of the control valve and a variety of other causes which may be present in different systems. At the same time, the various massive components of the system, such as the control valve 24 and the motors 14, 16 as supported and used in this environment, tend to apply vibratory forces to the interconnecting hydraulic lines 28 and 30. These vibratory forces to which the connecting lines are exposed can be accompanied by a substantial working or movement of the interconnected components relative to each other.

Hence, it is extremely desirable and in many instances essential that at least a portion of interconnecting hydraulic lines (such as the lines 28, 30 in the system 10) be formed of flexible hose or conduit capable of withstanding vibration and flexure in service.

For the purpose of illustration, the fluid conduit 28 of the system 10 is shown to include two hose or flexible conduit segments 32, 34 connected to one end of the respective fluid motors 14, 16. Similarly, the other fluid line 30 includes two hose segments 36, 38 connected to the opposite ends of the respective motors 14, 16.

Because of the rather high fluid pressures used in a system of this character and the rather high temperatures present, it is extremely desirable to use impervious hose or flexible conduit formed of metal. Great strength is characteristic of impervious metal hose, the sidewall of which is normally corrugated to form either annular or helical convolutions which provide the desired flexibility or bending characteristics of the hose structure. Also, as compared to hose formed of other materials, corrugated metal hose has an exceptional ability to maintain its strength under extreme temperatures, particularly high temperatures such as may be encountered in operation of the fluid system 10 described.

Hence, the pressure and temperature conditions which attend operation of the fluid system 10 make it quite desirable that the hoses 32, 34, 36, 38 be formed of an impervious corrugated metal construction. However, in many fluid systems such as this where the use of metal hose would be extremely advantageous, it has been found that metal hoses are subject to failure and consequently are unsatisfactory, particularly in aircraft serivce and the like where reliability is of paramount importance. These failures arise even though the hose has an ultimate strength far in excess of that required to contain the fluid pressure involved.

The failures of corrugated metal hose in these systems arise from the inability of the hose to withstand shock loadings, fluid pressure impacts, vibratory mechanical forces and other exciting influences applied to the hose from the environment.

A most significant point here in regard to the present invention is that despite the intensive effort applied to this problem by highly skilled people, corrugated metal hose has continued to fail prematurely when used in hydraulic systems of the character described.

By way of a quantitative example of the externally applied stress which such hoses must be capable of withstanding, it is noteworthy that in setting up test requirements for hose which will be subjected to impulse shock loading, the military services have prescribed that hose for carrying operating pressure of 3,000 pounds per square inch must be capable of withstanding impulse pressure loads of 4,500 pounds per square inch which are applied at a rate of 200,000 pounds per square inch of pressure per second. Moreover, the hose must be capable of withstanding complete pressure changes, including hydraulic pulse pressures of the character recited, applied through rapid recurring cycles over an extended period of time. Previously, corrugated metal hose has not been able to meet this test. Moreover, the requirements made of hose to be used in aircraft and missile service, for example, are becoming more stringent.

In addition to stresses induced by impulse pressure loadings, hose may be subject to additional stresses induced by fluids moving at extremely high speeds or by mechanically applied vibratory forces or the like.

Despite the well recognized need for corrugated, impervious metal hose suitable for use in hydraulic systems of the character described, none has been forthcoming. Consequently, it has been necessary to resort to use of hose formed from nonmetallic materials, such, for example, as the best available elastomeric and polymeric compounds. In general, such hose materials are capable of withstanding vibration quite well and the performance of hose formed of these materials has been improved through various reinforcing expedients.

Nevertheless, hoses formed from such nonmetallic materials are subject to a number of serious shortcomings and disadvantages. A most serious shortcoming of hoses formed of these nonmetallic materials is the marked loss of strength of the materials under extreme temperatures, particularly high temperatures. Many of such hose materials are unsuitable for use at temperatures above 250° F. and those materials compounded for use over a temperature range greater than 300° F. usually suffer from other physical shortcomings such as low tensile strength, high compression set and tendencies to creep. Also, such nonmetallic hose materials are subject to deterioration and loss of strength and dependability due to aging, the aging sometimes being accelerated by elevated temperatures.

The present invention provides improved fluid systems in which the failure of flexible hose or conduit is overcome even when the hose is operated under high pressure and extreme temperature conditions and subjected to repeated pressure shock loadings and vibrating forces from the external environment and to exciting forces generated in the fluid contained in the hose. The hose provided and used in accordance with the invention to avoid the shortcomings previously associated with prior hoses is formed entirely of metal and has a composite construction which provides high strength and flexibility together with the ability to withstand shock and vibration and rapidly changing fluid pressures at very high temperatures and at low temperatures as well as at moderate temperatures.

The hose 32, for example, is formed in accordance with the invention of a plurality of all-metal tubes or plys, which include a plurality of concentric load bearing tubes or plys which have sufficient combined strength to contain the pressure within the hose while at the same time providing the required margin of safety. Thus, the hose 32 comprises, as shown in FIGS. 4 and 5, an inner tube 40 and an outer tube 42 which serve, as will presently appear, to sustain or bear the force or load of the fluid pressure within the hose.

To provide the strength required of the hose, while at the same time maximizing the flexibility of the hose, the load sustaining tubes 40, 42 are fabricated of metal having a high tensile strength; such, for example, as stainless steel, steel, Inconel, or Monel. A concomitant of such high strength metals is a characteristically high modulus of elasticity and a high coefficient of resiliency.

Hence, such high strength metals upon being flexed below their elastic limits manifest only a very low absorption of energy. When flexed below their elastic limits, load bearing hose tubes formed of such high strength metals store the energy which produces the flexure of the tubes. This energy stored in the high strength load bearing tubes of the hose is subsequently released in the form of dynamic or kinetic energy, as will presently appear. The physical character of a solid material which causes the material to absorb energy upon being flexed is accurately described as "internal friction." The high strength metal used to form each of the load sustaining tubes 40, 42 inherently has low internal friction in that it absorbs little energy upon being flexed.

As will be described later in detail, the composite wall structure 44 of the hose 32, including the load bearing tubes 40, 42, is shaped to define closely adjacent circumferential corrugations or convolutions which provide the desired flexibility in the hose. The strength and physical characteristics of the metal hose are such that the hose does not appreciably expand or contract in diameter when subjected to changing internal pressures. However, the corrugations or convolutions 46 in the hose wall are flexed axially or caused to "breathe" upon changing of the pressure within the hose.

Yet, the strength of the load sustaining tubes 40, 42 is such that the fluid pressure within the hose does not stress the high strength metal structure of these tubes beyond its elastic limit.

Flexure or working of the convolutions 46 is necessarily attended by a storing of spring energy in the high strength metal structure of the load sustaining tubes 40, 42. This flexure of the load sustaining tubes and the attendant storing of spring energy in the tubes can be produced from other causes, such as the mechanical application of vibratory forces from the external environment. Also, extremely high velocities of fluid flow through a hose can set up vibratory forces which are applied to the hose structure to produce flexing of the convolutions in the hose wall.

When a house is subjected to vibratory forces or to rapid and recurring changes in fluid pressure, the individual convolutions 46 in the hose wall are alternately stressed and relaxed in rapid succession.

The spring energy released upon relaxing of any component portion of the hose wall is transformed into dynamic or kinetic energy, which energy is in large measure imparted to the structure of the hose itself to induce continued flexing of the wall convolutions, with the result that the energy involved is alternately transformed into stored spring energy and into kinetic energy in various portions of the hose.

The imparting of energy into the structure of a hose in this manner can be aggravated by a continued excitation or stimulation of the hose by the application of external vibratory forces or the stimulus of rapidly changing fluid pressures with the result that there can be a cumulative buildup of energy in the hose structure.

The effect of this previously has been failures and unsatisfactory performance of all-metal hose used in environments which subject the hose to punishment of this character.

The improved all-metal hose provided by this invention is capable of performing reliably and satisfactorily under the same environmental conditions in which all-metal hose has been previously unacceptable. Hose failures are obviated in the improved all-metal hose in a manner which preserves the inherent advantages of all-metal hose in maintaining its inherently high strength under extreme temperature conditions and in having a virtual immunity to deterioration through aging.

Thus, as shown in FIGS. 4 and 5, the two load sustaining tubes 40, 42 of the improved hose 32 are uniformly spaced from each other throughout the length of the corrugated wall 44 of the hose by a distance approximating the thickness of each of the load bearing tubes. The inner tube 40 and the outer tube 42 have different average diameters, the difference in the diameters of the tubes being increased by the spacing of the tubes from each other. Hence, these tubes formed of high strength metal have a substantially different mass per unit length, the thicknesses of the two tubes being approximately the same. Moreover, the circumferential convolutions of the two tubes have a substantially different resistance to flexure. Thus, in a sense, the two tubes have different "spring constants" or spring characteristics.

Consequently, the two load bearing tubes 40, 42, upon being vibrationally excited, will vibrate at different natural or resonant frequencies. The harmonics of the fundamental frequencies of the two tubes are correspondingly different.

Each of the high strength tubes 40, 42, is made to carry its share of the pressure load in the hose 32 while at the same time serving to check vibration of the other tube to reduce the generation of stresses in the hose which tend to cause fatigue failures of the hose structure. Since the two load sustaining tubes 40, 42 have different fundamental frequencies and different harmonic frequencies, the two tubes upon being excited will tend to vibrate out of phase of each other.

These strong load sustaining tubes, which have a tendency to vibrate as an unavoidable concomitant of the strength of these tubes, are caused to work against each other, when vibrating, through an intervening tube 48 formed of a metal having a low coefficient of resiliency which causes the intervening tube upon being flexed to absorb and transform into heat a very large portion of the energy applied to this tube in producing the flexure. Metals having a low coefficient of resiliency, and hence a great ability to absorb energy when flexed, also have a characteristically low modulus of elasticity and much less strength than the previously described metals used in forming the load bearing tubes 40, 42. Thus, the metal used to form the tube 48 can be accurately described as having high internal friction or internal friction which is relatively high in relation to the internal friction of the metal used to form each of the pressure load sustaining tubes 40, 42.

Bronze, composed of 98% copper and 2% tin, is well suited as a structural material for the intervening tube 48. Magnesium and aluminum have low coefficients of resilience, low moduli of elasticity and high internal friction which are desired in the intervening tube 48. Preferably, the thickness of the intervening energy absorbing tube 48 is approximately equal to that of each of the load bearing tubes 40, 42. As shown in the drawings, FIGS. 4 to 10, the intervening tube 48 is of imporous construction and has smooth inner and outer surfaces.

The hose 32 is formed, in a manner to be described presently, which produces firm intimate contact of the internal surface of the intervening tube 48 with the external surface of the inner load bearing tube 40, which contact is continuous circumferentially around the tube 40 and continuous axially along the common length of these tubes. Also, the hose is formed in a manner which provides firm and intimate contact between the external surface of the intervening tube 48 and the internal surface of the outer load bearing tube 42, which is circumferentially and axially continuous along the common length of these tubes. Thus, the tube 48, which is generally incompressible because of its imporous construction, is made to fit solidly against both load bearing tubes 40, 42.

Because of its low modulus of elasticity and its low coefficient of resilience, the intervening tube 48 itself has little tendency to vibrate when the hose 32 is subjected to influences of the character described, which tend to cause vibration. Thus, because of the relatively low modulus of elasticity of the intervening tube 48 as compared to the moduli of elasticity of the load sustaining tubes 40, 42, the amount of energy imparted to the intervening tube 48 as an incident to flexing of any particular convolution 46 of the hose wall is small in relation to that imparted to the stronger load sustaining tubes 40, 42. This fact together with the ability of the intervening tube to absorb and dissipate energy used in flexing the tube virtually eliminates any tendency of the intervening tube itself to vibrate.

The tendency which each of the load bearing tubes 40, 42 has to transmit its vibratory movements to the intervening tube 48 is countered by impulses applied to the opposite side of the intervening tube by the other load bearing tube. The fact that the vibratory impulses which the two load bearing tubes 40, 42 apply to opposite sides of the intervening tube 48 are out of phase with each other tends to maintain the intervening tube in a stabilized, buffering position in which vibration is minimized.

Yet, because the intimate contact of the inner and outer surfaces of the intervening tube 48 with the inner and outer load bearing tubes 40, 42 incipient vibrations in the load bearing tubes produce a working of the energy absorbing material of the intervening tube, which transforms the energy of the vibratory forces into heat that is harmlessly dissipated.

Consequently, there is no buildup of energy in the hose which will produce stresses to cause the fatigue failures which have been the source of failures of metal hose in fluid systems of the character to which this invention is directed.

As tightly sandwiched between the intervening load sustaining tubes 40, 42, the intervening tube 48 forces the outer tube 42 to sustain its component share of the fluid pressure load on the hose.

Manufacture of the improved hose in accordance with the invention is illustrated in FIGS. 6 to 11. Thus, as shown in FIG. 6, an impervious cylindrical tube 48 of bronze is telescoped into an impervious cylindrical tube 42 of stainless steel, the tubes being dimensioned to provide a close fit with each other. Similarly, an impervious cylindrical tube 40 formed of stainless steel is telescoped into the cylindrical tube 48, the tube 40 being dimensioned to have a close fit within the tube 48.

The three mutually telescoped tubes are then subjected to swaging and compressing operations which intensify the engagement of the mutually opposed cylindrical surfaces of the tubes.

Thus, as illustrated in FIG. 8, a sizing or expanding plug 50 is drawn longitudinally through the telescoped tubes to expand the innermost tube 40 somewhat beyond its elastic limit to produce a residual enlargement of this tube. After passing of the expansion or sizing plug 50, the innermost tube 40 has a greater tendency to remain expanded than does the outermost tube 42, which produces a tight fit of the innermost tube within the intervening tube 48.

FIGURE 9 illustrates a drawing or constricting of the tubes to reduce the size of the outermost tube 42. Thus, as shown, the three tubes are moved simultaneously through a constricting throat 52 of a drawing die 54 which is designed to produce deformation of the outer tube 42 tending to provide a residual tight fit of the outer tube around the intervening tube 48.

To provide an even firmer engagement of the mutually opposing surfaces of the three tubes, the tubes may be moved longitudinally through a compression die 56 which comprises, as shown in FIG. 10, an external drawing die 58 defining a constricting throat 60 which comprises the telescoped tubes firmly against an expanding die plug 62 supported in the innermost tube 40 in axial alinement with the throat 60.

The three tubes 40, 42 and 48 thus formed to intimate contact with each other are corrugated to form the previously mentioned corrugations or circumferential convolutions 46 in the wall 44 of the hose, FIGS. 4 and 5.

A most satisfactory mode of corrugating the tubes to define helical convolutions is illustrated in FIG. 11. Thus, as shown, the telescoped tubes 40, 48, and 42 are moved through four helical corrugating rings or dies 64, 66, 68 and 70 which shape the composite wall of the three tubes to form the corrugations in a manner which, together with the previously described achievement of intimate contact between the mutually opposed surfaces of the tubes, avoids the creation of voids or spaces between the contiguous surfaces of the tubes to provide intimate contact between the tube surfaces which continues throughout the profile of all of the convolutions 46. Hose corrugating apparatus suitable for this purpose is disclosed in United States patent application Serial No. 792,792, filed February 12, 1959.

The hose thus formed is reinforced against axial elongation under pressure in the same manner as conventional corrugated metal hose. Thus, as shown in FIG. 3, a metal hose 72 formed in the manner described is covered by two braided reinforcing sheaths 74 and 76 also formed of stainless steel. Opposite ends of the hose 72 are connected to high pressure couplings 78, 80, FIGS. 2 and 3.

The coupling 78 illustrated in longitudinal section in FIG. 3 comprises an inner barrel element 82 fitted into the adjacent end of the hose, which is encircled by a collar 84. The collar 84, barrel 82, and the coupling ends of the hose 72 and reinforcing sheaths 74, 76 are all bonded together by silver solder 86 to form a sturdy fluid tight connection between the coupling and the hose which is capable of containing high fluid pressures without leaking.

As shown in FIG. 2 the reinforced hose 72 is incorporated into a fluid system by being connected between a high pressure pump 87 and a fast action shutoff valve 88 controlled by a solenoid 90.

In this manner applicant has eliminated the failure of all-metal hose in fluid systems which have previously caused unavoidable failures of all-metal hose. High pressure hydraulic systems incorporating fast action solenoid valves characteristically produce high peak pressure impulses or surges in connected conduits as an incident to operation of the valves.

Hose failures in the fluid system 10 previously described are avoided by the invention by using all-metal flexible hoses 32, 34, 36 and 38 constructed in the manner described.

While the improved hose illustrated has only two load sustaining tubes, it will be understood that a larger number of load sustaining tubes can be used provided the hose is properly protected against failure by energy absorbing tubes formed of metal having low moduli of elasticity and low coefficients of resiliency sandwiched between the load bearing tubes in the manner described.

The invention is claimed as follows:

1. A flexible metal conduit for conducting fluid under high pressure in environments which subject the conduit to vibratory forces, comprising three concentric all-metal tubes telescoped together to form a multiwalled conduit, the innermost and the outermost ones of said three tubes constituting first and second imporous pressure load sustaining tubes formed of high strength metal having a high modulus of elasticity and low internal friction; the third one of said three tubes constituting a one-piece, imporous damping tube disposed in concentric intervening relation to said load sustaining tubes and having smooth, impervious inner and outer surfaces in direct surface engagement respectively with the outer surface of the inner one of said load sustaining tubes and with the inner surface of the outer one of said load sustaining tubes; the surface engagement of said damping tube with each of said load sustaining tubes being circumferentially continuous with respect to the corresponding tubes and extending continuously along the common length of the corresponding tubes, said damping tube being formed of a metal having relatively low strength in relation to the strength of the metal forming said load sustaining tubes and having a modulus of elasticity and internal friction which are respectively relatively low and relatively high in relation to the corresponding physical properties of the metal forming said load sustaining tubes, and all of said three tubes being shaped to define therein circumferential convolutions which are common to all three tubes and in which said continuous surface engagement of said imporous damping tube with each said load sustaining tubes is maintained both circumferentially and along the common length of the respective tubes.

2. A flexible metal conduit for conducting fluid under high pressure in environments which subject the conduit to vibratory forces, comprising, three concentric metal tubes telescoped together to form a multiwalled conduit, the innermost and the outermost ones of said three tubes constituting first and second imporous pressure load sustaining tubes formed of metal having low internal friction; the third one of said three tubes constituting an imporous damping tube disposed in concentric intervening relation to said load sustaining tubes and having smooth, impervious inner and outer surfaces; said damping tube being formed of a metal having internal friction which is very high in relation to the internal friction of the metal forming said load sustaining tubes; and all of said three tubes being corrugated together along the length of the conduit to form in the conduit circumferential flexing convolutions which are common to all three tubes and in which convolutions the smooth impervious inner and outer surfaces of said damping tube have with the outer surface on the inner one of said load sustaining tubes and with the inner surface on the outer one of said load sustaining tubes respectively intimate surface engagement which is circumferentially continuous with respect to the corresponding tubes and which extends continuously along the common length of the corresponding tubes.

3. A flexible metal hose for conducting fluid under high pressure in environments which subject the hose to vibratory forces, comprising, three concentric metal tubes telescoped together to form a multiwalled conduit, the innermost and the outermost ones of said three tubes constituting first and second imporous pressure load sustaining tubes formed of metal having low internal friction; the third one of said three tubes constituting an imporous damping tube disposed in concentric intervening relation to said load sustaining tubes and having smooth, impervious inner and outer surfaces; said damping tube being formed of a metal having internal friction which is very high in relation to the internal friction of the metal forming said load sustaining tubes; all of said three tubes being corrugated together along the length of the conduit to form in the conduit circumferential flexing convolutions which are common to all three tubes and in which convolutions the smooth impervious inner and outer surfaces of said damping tube have with the outer surface on the inner one of said load sustaining tubes and with the inner surface on the outer one of said load sustaining tubes respectively intimate surface engagement which is circumferentially continuous with respect to the corresponding tubes and which extends continuously along the common length of the corresponding tubes; and a flexible tension load sustaining sheath extending lengthwise along the conduit in closely encircling, coacting relation to the conduit to restrain the conduit against elongation by internal fluid pressure.

References Cited in the file of this patent

UNITED STATES PATENTS

| | | |
|---|---|---|
| 979,460 | Fulton | Dec. 27, 1910 |
| 2,039,781 | Debenedetti | May 5, 1936 |
| 2,068,958 | McConkey | Jan. 26, 1937 |
| 2,818,636 | Fentress et al. | Jan. 7, 1958 |
| 2,838,074 | Laurk | June 10, 1958 |
| 2,899,982 | Harpfer | Aug. 18, 1959 |
| 2,932,323 | Aries | Apr. 12, 1960 |
| 2,965,961 | Schindler | Dec. 27, 1960 |

FOREIGN PATENTS

| | | |
|---|---|---|
| 721,495 | France | Dec. 22, 1931 |

OTHER REFERENCES

Simplex Company publication, bulletin #365, "Triple Safe Tubing," 2 pages; received in the Patent Office August 7, 1937 (copy in Division 11).